United States Patent
Seto et al.

[11] Patent Number: 5,862,733
[45] Date of Patent: Jan. 26, 1999

[54] WORKPIECE FEEDING APPARATUS FOR A TURRET PUNCH PRESS

[75] Inventors: Yoshiharu Seto; Shunzo Hirose, both of La Mirada, Calif.

[73] Assignee: Amada MFG America Inc., LaMirada, Calif.

[21] Appl. No.: 859,352

[22] Filed: May 20, 1997

Related U.S. Application Data

[63] Continuation of Ser. No. 490,173, Jun. 14, 1995, abandoned.

[51] Int. Cl.$^6$ ........................................... B26D 5/08
[52] U.S. Cl. ....................... 83/552; 83/435.11; 83/435.21; 83/437.4
[58] Field of Search ................................. 83/405, 435.11, 83/435.21, 437.1, 437.3, 437.4, 552, 549, 707, 916, 72, 391, 412, 417; 74/490.09

[56] References Cited

U.S. PATENT DOCUMENTS

| | | | |
|---|---|---|---|
| 2,958,247 | 11/1960 | Levine | 83/552 X |
| 3,668,377 | 6/1972 | Inaba et al. | 318/571 X |
| 3,793,896 | 2/1974 | Price et al. | 74/89.15 |
| 3,945,282 | 3/1976 | Aizawa | 83/552.18 X |
| 4,143,571 | 3/1979 | Oxenham | 83/552 X |
| 4,162,641 | 7/1979 | Stubbings | 83/552 X |
| 4,373,404 | 2/1983 | Heinz | 74/424.8 B |
| 4,532,843 | 8/1985 | Miyama | 83/549 X |
| 4,557,156 | 12/1985 | Teramachi | 74/424.8 R X |
| 4,700,441 | 10/1987 | Ikeda et al. | 83/549 X |
| 4,802,567 | 2/1989 | Ikeda et al. | 269/58 X |
| 4,864,883 | 9/1989 | Mayfield | 74/424.8 R |
| 5,119,666 | 6/1992 | Fujiwara | 83/552 X |
| 5,289,096 | 2/1994 | Takeda | 83/552 X |
| 5,311,790 | 5/1994 | Yanagisawa | 74/490.09 |
| 5,355,744 | 10/1994 | Yanagisawa | 74/490.09 |
| 5,545,116 | 8/1996 | Seto | 83/552 X |
| 5,559,413 | 9/1996 | Seto | 318/571 X |
| 5,577,312 | 11/1996 | Seto | 83/27 X |
| 5,613,400 | 3/1997 | Sato et al. | 74/424.8 R X |
| 5,616,112 | 4/1997 | Seto et al. | 83/552 X |

*Primary Examiner*—M. Rachuba
*Attorney, Agent, or Firm*—Blank Rome Comisky & McCauley LLP

[57] ABSTRACT

Two drive motors (9L, 9R) are provided on both sides of the ball screw (5), and the ball screw is driven by these two drive motors simultaneously. Therefore, the ball nut (17) attached to the worktable and in mesh with the ball screw (5) can be moved reciprocatingly to move and locate the worktable (15) on which workpiece (W) is clamped. Since the ball screw can be rotated by the two drive motors together, even if a ball screw of large lead is used, the maximum rotational speed and the maximum acceleration can be both increased, so that the workpiece can be located in position in a short time. In addition, since the torsional stress and strain generated in the ball screw can be both reduced, the locating precision can be further improved. When the workpiece feeding apparatus is applied to a turret punch press, for instance, the carriage (49) is driven and located in the X-axis direction, and the carriage base (39) is driven and located in the Y-axis direction, both by use of the above-mentioned workpiece feeding apparatus.

7 Claims, 5 Drawing Sheets

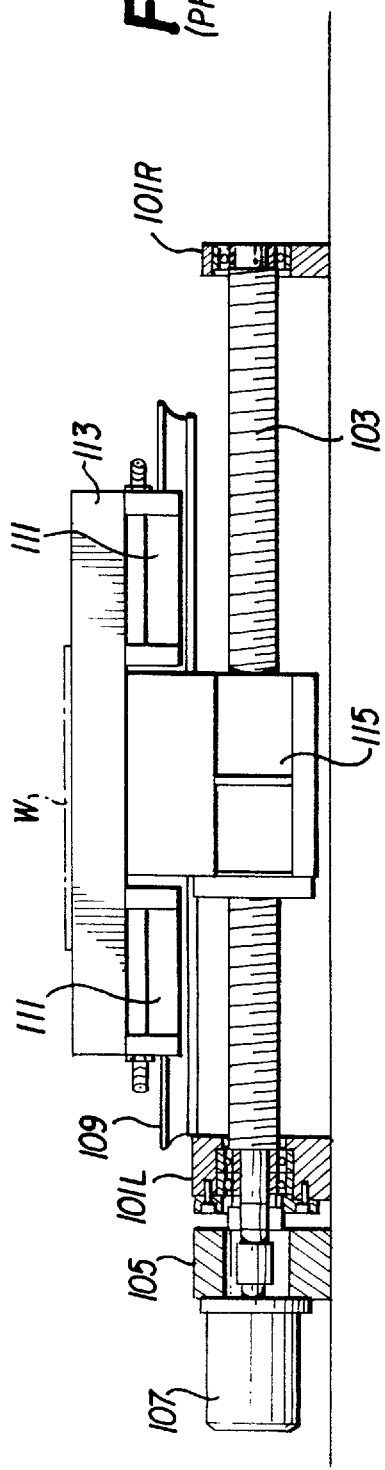
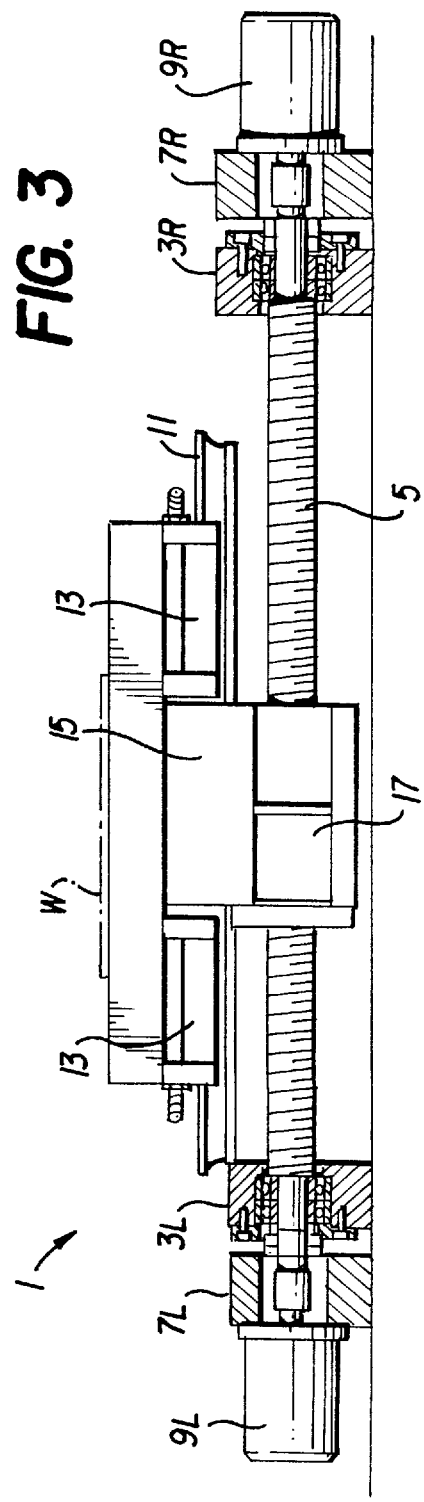

WORKPIECE FEEDING APPARATUS FOR A TURRET PUNCH PRESS

This is a continuation of application Ser. No. 08/490,173, filed on Jun. 14, 1995, now abandoned.

BACKGROUND OF THE INVENTION

1. Field of the Invention

The present invention relates to a workpiece feeding apparatus for a plate processing machine, and more specifically to a work feeding apparatus for a plate processing machine which can locate work at high speed.

2. Description of the Prior Art

FIG. 1 shows a typical example of a workpiece feeding apparatus mounted on a worktable for a punch press, for instance.

In more detail, a ball screw 103 extending in a workpiece feed direction (the right and left in FIG. 1) is rotatably supported by two bearings 101L and 101R. This ball screw 103 is rotated by a drive motor 107 mounted on one (e.g., left) side of the ball screw 103 via a gear mechanism 105, for instance. On the other hand, a ball nut 115 in mesh with the ball screw 103 is attached to the lower surface of a worktable 113. The worktable 113 is provided with a slider 111 movable along a guide rail 109 fixed so as to extend in the workpiece feed direction.

Therefore, when the motor 107 is driven, since the ball screw 103 is driven or rotated by the motor 107 via the gear mechanism 105, the ball nut 115 is moved along the ball screw 103, so that worktable 113 can be moved in both the rightward and leftward in the workpiece feed direction.

In the above-mentioned prior art workpiece feeding apparatus, the maximum speed of the worktable 113 for clamping workpiece W is decided on the basis of both the maximum number of revolutions of the drive motor 107 and the lead of the ball screw 103. In this case, however, since there exists a limit of the maximum number of revolutions of the drive motor 107, when the feed speed is required to increase, it is necessary to increase only the lead of the ball screw 103.

When the lead of the ball screw 103 is simply increased, since an inertia (i.e., load) of the motor shaft increases, the output torque required for the drive motor 107 also increases. On the other hand, however, since there exists a limit of the output torque of the drive motor 107, there exists a problem in that it is impossible to simply increase the lead of the ball screw 103, as with the case of the punch press in which high acceleration or high deceleration motion is often required for the worktable, in particular.

Here, it should be noted that the maximum speed of the ball screw and the worktable feeding efficiency are different from each other. In more detail, FIG. 2A shows the worktable speed when the ball screw 103 of a small lead is used, and FIG. 2B shows the worktable speed when the ball screw 103 of a large lead is used, on condition that the output torque of the drive motor 107 is the same. In the case shown in FIG. 2A, although the total time t1 from when the worktable 113 begins moving to when it stops moving is relatively short, the maximum speed Vmax of the ball screw 103 is low. In the case shown in FIG. 2B, although the maximum speed Vmax of the ball screw 103 can be increased, the total time t2 from when the worktable 113 begins moving to when it stops moving is relatively long. In other words, when the lead of the ball screw 103 is simply increased as shown in FIG. 2B, although the maximum speed Vmax can be increased, since the acceleration of the motor 107 is low, a long time is required from when the worktable 113 begins moving to when it stops moving, with the result that the work feeding efficiency becomes low on the contrary. On the other hand, since there exists a limit of the maximum torque of the drive motor 107, it is impossible to increase the acceleration of the worktable 113.

SUMMARY OF THE INVENTION

With these problems in mind, therefore, it is the object of the present invention to provide a workpiece feeding apparatus for a plate processing machine and a plate processing machine using the same workpiece feeding apparatus, by which workpiece can be moved at a short time.

To achieve the above-mentioned object, the present invention provides a workpiece feeding apparatus for a plate processing machine, which includes a worktable (15) for mounting a workpiece; a ball nut (17) attached to the worktable; a ball screw (5) rotatably supported on both sides of the place processing machine and in mesh with the nut; and two drive motors (9L, 9R) provided on both sides of the ball screw, the two drive motors rotating the ball screw simultaneously to feed the worktable via the ball nut in an axial direction of the ball screw.

Further, the present invention provides a workpiece feeding apparatus for a plate processing machine which includes a carriage (49) having a clamper (47) for clamping a workpiece; a first ball nut (55) attached to the carriage; a first ball screw (53) rotatably supported on both sides of the plate processing machine and in mesh with the first ball nut; two first drive motors (51L, 51R) provided on both sides of the first ball screw, the two first drive motors rotating the first ball screw simultaneously to feed the carriage via the first ball nut in a first axial direction; a carriage base (39) for movably supporting the carriage in the first axial direction, the carriage base being movable in a second axial direction perpendicular to the first direction, a second ball nut (45) attached to the carriage; a second ball screw (43) rotatably supported on both sides of the plate processing machine and in mesh with the second ball nut; and two second drive motors (41L, 41R) provided on both sides of the second ball screw, the second drive motors rotating the second ball screw simultaneously to feed the carriage base via the second ball nut in the second axial direction.

Further, the workpiece feeding apparatus according to the present invention can be well applied to the plate processing machine such as a turret punch press.

As described above, in the workpiece feeding apparatus for a plate processing machine according to the present invention, since the ball screw is rotated by driving the two drive motors provided on both sides thereof, a large driving force can be obtained. As a result, even if the lead of the ball screw is increased, since the maximum speed and the high acceleration can be both obtained, it is possible to locate work at any desired position in a short time. Further, since the ball screw is rotated at both the ends thereof, it is possible to reduce both the torsional stress and torsional strain generated in the ball screw, so that the locating precision can be further improved.

BRIEF DESCRIPTION OF THE DRAWINGS

FIG. 1 is a side, partially cross-sectional, view showing a prior art workpiece feeding apparatus for a plate processing machine;

FIG. 3 is a side, partially cross-sectional, view showing an embodiment of the work feeding apparatus for a plate processing machine according to the present invention;

DETAILED DESCRIPTION OF THE PREFERRED EMBODIMENTS

Figure 2A:
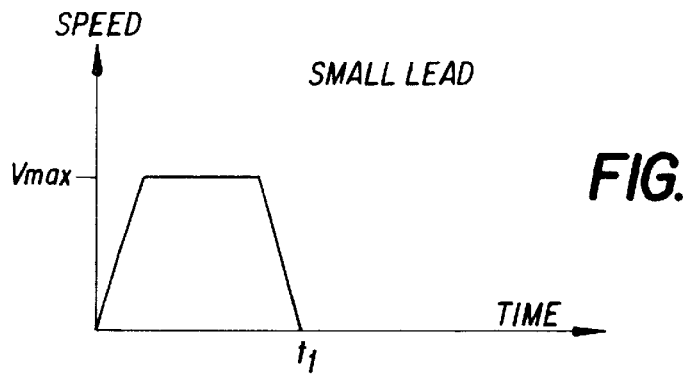
FIGS. 2A and 2B are graphical representations showing the ball screw speed, in which 2A represents the case of a small lead, and 2B represents the case of a large lead.
Figure 2B:
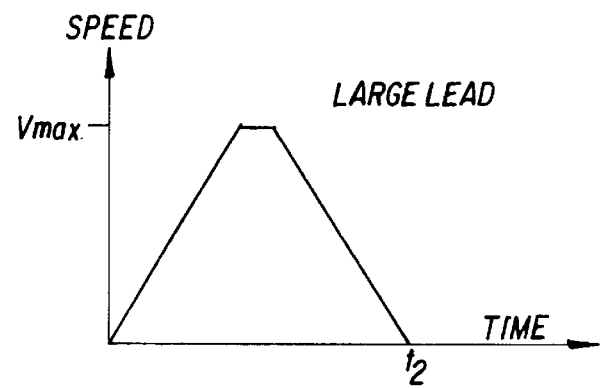

A preferred embodiment of the work feeding apparatus according to the present invention will be described in further detail with reference to the attached drawings.

As shown in FIG. 3, in the work feeding apparatus 1 for a plate processing machine, a ball screw 5 is rotatably supported by two bearings 3L and 3R on both sides thereof. Further, two drive motors 9L and 9R are provided on both sides of the ball screw 5 via two gear mechanisms 7L and 7R, respectively. On the other hand, a ball nut 17 in mesh with the ball screw 5 is attached to the lower surface of a worktable 15. The worktable 15 is provided with a slider 13 movable along a guide rail 11 fixed so as to extend in the workpiece feed direction (the right and left direction in FIG. 3).

Therefore, when the motors 9L and 9R are both driven, since the ball screw 5 can be driven or rotated by the motors 9L and 9R via the gear mechanisms 7L and 7R in the same work feed direction, the ball nut 17 is moved along the ball screw 5, so that worktable 15 can be moved in both the rightward or leftward feed direction of the worktable 15.

Here, with reference to FIGS. 4A to 6, the operation of the worktable 15 driven by the two drive motors 9L and 9R will be explained, in comparison with the prior art case where a single drive motor 107 is used.

Figure 4A:
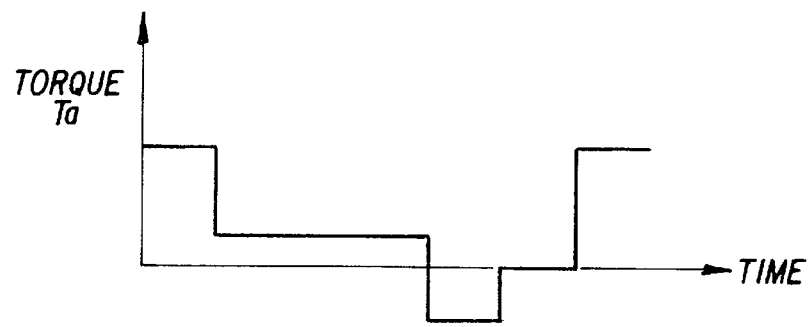
FIGS. 4A to 4C are graphical representations showing the motor torques with respect to time, in which one Ta of the two motor torque is shown in FIG. 4A; and the other Tb of the two motor torque is shown in FIG. 4B; and a sum total (Ta+Tb) of the two drive motors is shown in FIG. 4C.
Figure 4B:
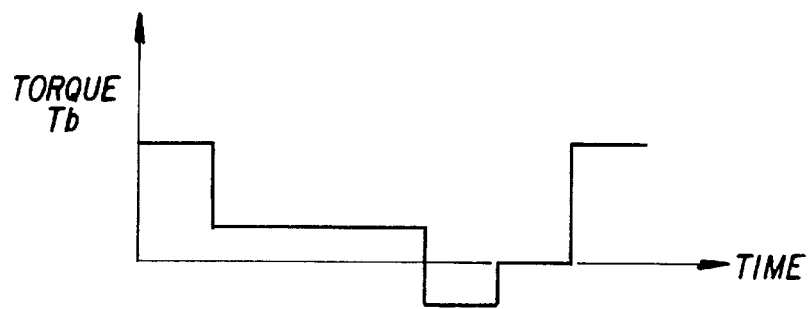
Figure 4C:
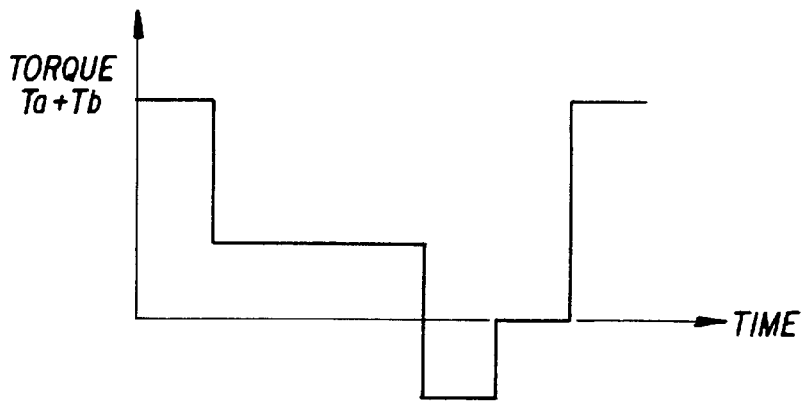
Figure 4D:
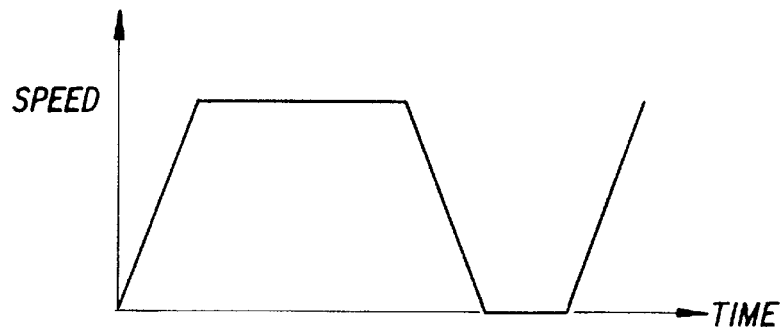
FIG. 4D is a graphical representation showing the motor speed obtained when two drive motors are used.

FIG. 4A shows a torque Ta of one of the two drive motors 9L and 9R; FIG. 4B shows a torque Tb of the other of the two drive motors 9L and 9R; and FIG. 4C shows a torque (Ta+TB) of the two drive motors 9L and 9R. When the two torques Ta and Tb are equal to each other, the obtained torque can be doubled as shown in FIG. 4C. FIG. 4D shows the speed and acceleration obtained when the motor drive torque (T2=Ta+Tb=2Ta=2T1) is doubled, which is compared with the case when only a single drive motor is used.

Figure 5A:
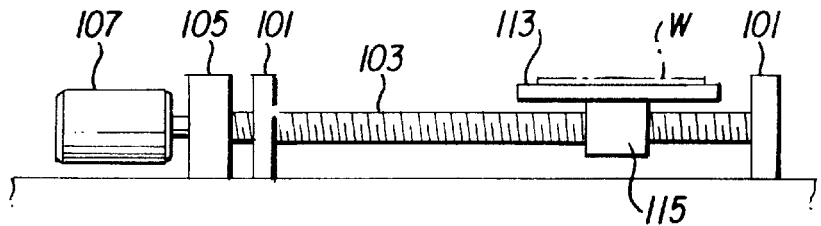
FIG. 5A is a side view showing the workpiece feeding apparatus, in which a single drive motor is used.

In FIG. 5A in which only a single drive motor 107 is used, the inertia of the workpiece W and the worktable 113 is denoted by JW1; and the lead of the ball screw 103, supported by the two bearings 101L and 101R, is denoted by L1. On the other hand, in FIG. 5B in which the two drive motors 9L and 9R are used, the inertia of the workpiece W and the work table 113 is denoted by JW2; and the lead of the ball screw 103 is denoted by 12 (L2=2×L1), then the following expressions can be obtained:

$$JW1=(W/G)(L1/2\pi)^2$$

$$JW2=(W/G)(L2/2\pi)^2=4\cdot(W/G)(L1/2\pi)^2=4\cdot(W/G)(L1/2\pi)^2=4\cdot JW1$$

where G denotes the gravitational acceleration.

Figure 5B:
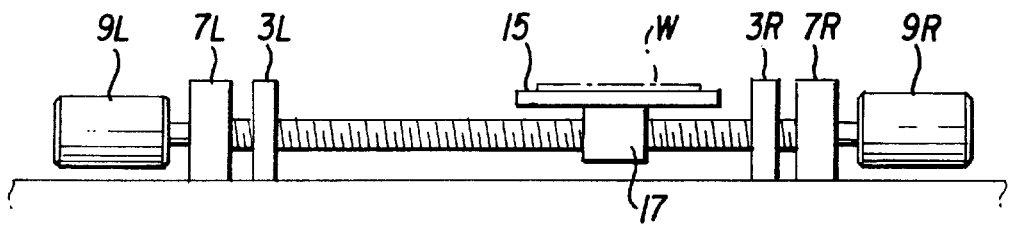
FIG. 5B is a side view showing the workpiece feeding apparatus, in which two drive motors are used.

Further, when the load torque shown in FIG. 5A is denoted by T1, and the load torque shown in FIG. 5B is denoted by T2, the obtained torque T2 is $$T2=2\cdot T1$$

Figure 6:
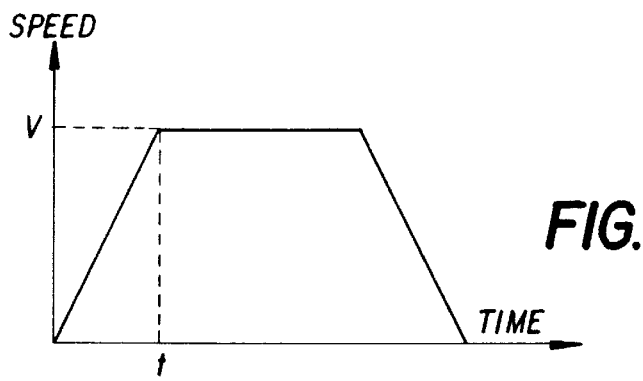
FIG. 6 is a graphical representation for assistance in explaining the motion mode.
Figure 7:
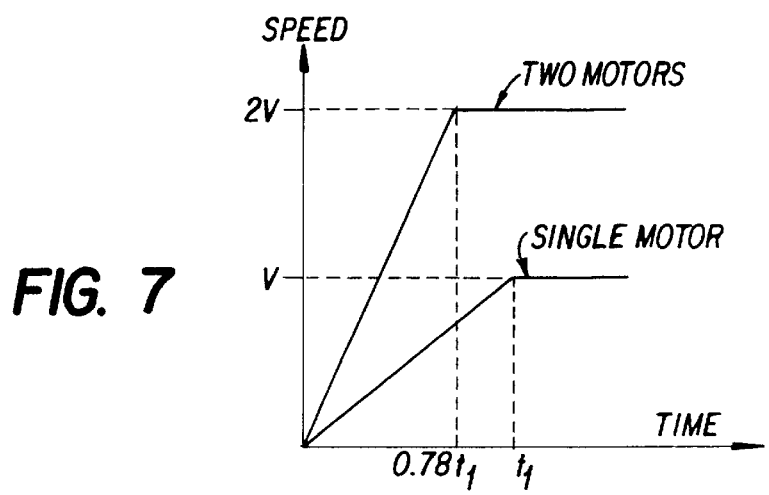
FIG. 7 is a graphical representation showing acceleration and speed of the ball shaft for comparison between when a single drive motor is used and when two drive motors are used.

Here, the motion mode as shown in FIG. 6 will be considered. In FIG. 6, the time t at which the maximum speed v is obtained is denoted by t1 in the case of FIG. 5A and the time t at which the maximum speed v is obtained is denoted by t2 in the case of FIG. 5B, respectively, the load torque at acceleration (=acceleration torque+frictional torque) can be expressed as $$T1=(2\pi N/60t1)(JW1+JS+JM)+Tf$$

$$T2=(2\pi N/60t2)(JW2+JS+2JM)+Tf$$

where JM denotes the inertia of the motor rotor; JS denotes the inertia of the ball screw; N denotes the number of revolutions of the ball screw; and Tf denotes the frictional torque.

In general, in the case of the punch press, if assumed as $$JW1=JM \text{ and } JW1=JS$$

the following expressions can be obtained:

$$\begin{aligned} T1 &= (2\pi N/60t1)\cdot 3 \cdot JW1 + Tf \\ &= (3/t1)(2\pi N/60)\cdot JW1 + Tf \\ &= (3/t1)A + Tf \\ T2 &= (2\pi N/60t2)(4\cdot JW1 + JS + 2\cdot JM) + Tf \\ &= (2\pi N/60t2)\cdot 7 \cdot JW1 + Tf \\ &= (7/t2)A + Tf \end{aligned}$$

where $A=2\pi N/60$

Accordingly, from T2=2T1, the following expression can be obtained $$(7/t2)A+Tf=2((3/t1)A+Tf)$$

That is, $$(7/t2)A=(6/t1)A+Tf \quad (1)$$

Further, from T1=(3/t1) A+Tf, in general the following expression can be obtained $$(3/t1)A \geq Tf \quad (2)$$

The expression (2) indicates that the acceleration torque≧frictional torque.

By substitution of the above expressions (1) and (2), $$(7/t2)A \leq (6/t1)A+(3/t1)A$$

$(7/t2 \leq (9/t1)(t2/t1)(7/9)$

Therefore, the following expression can be obtained $t2 \geq 0.78 t1$

Under these conditions, the maximum acceleration÷α2 at this time can be obtained as $\alpha 2 = 2v/t2 = 2v/0.78t1 = v/0.36t1$ or $\alpha 1 = v/t1$ Therefore, $\alpha 2/\alpha 1 = (v/0.36t1)/(v/t1) \approx 2.8$ As a result, it is possible to obtain α2 which is 2.8 times larger than α1.

As described above, as shown in FIG. 5B, where two drive motors 9L and 9R are used, it is possible to increase both the speed and acceleration, as compared with the case where only one motor 107 is used.

Further, even if the numbers of revolutions of these drive motors 107, 9L and 9R are equal to each other, since the lead of the ball screw 5 (the present invention) can be increased twice larger than the ball screw 103 (the prior art), it is possible to double the speed of the ball screw.

As described above, when the two drive motors 9L and 9R are both used, since a high acceleration can be obtained even if the ball screw of a large lead, the worktable can be moved at a high speed, so that the workability can be improved.

Further, in the present invention, in order to increase the speed of the ball screw, the lead of the ball screw is increased, without increasing the number of revolutions of the ball screw, it is unnecessary to consider D (diameter)/N(rotational speed) ratio of the ball screw.

Here, with reference to FIGS. 5A and 5B, and FIGS. 8A and 8B, the torsional stress generated in the ball screw 103 (invention) or 5 (prior art) will be explained hereinbelow for comparison.

Here, the assumption is made that the torque T1 of the drive motor 107 (the prior art) is twice larger than that T2 of the drive motors 9L and 9R (the invention) as follows:

$T1 = 2T2$

Figure 8A:
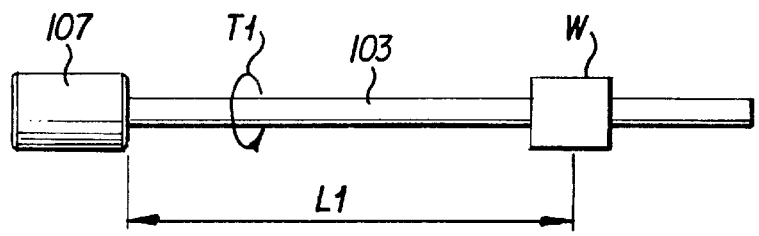
FIGS. 8A and 8B are illustrations for assistance in explaining the torsional stress generated in the ball screw, when a single drive motor is used in FIG. 8A and two drive motors are used in FIG. 8B, respectively.

When the single drive motor 107 is used, the torsional stress τ1 can be expressed with reference to FIG. 8A as $\tau 1 = 16T1/\pi D^3 = 2 \cdot (16T2/\pi D^3)$ where D denotes a shaft diameter of the ball screw.

Figure 8B:
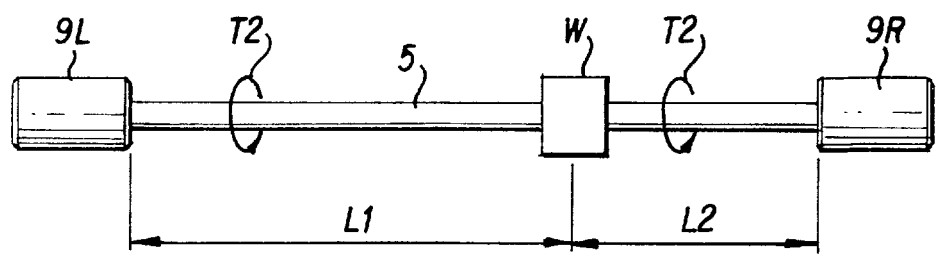

On the other hand, when the two drive motors 9L and 9R are used, the torsional stress τ2 can be expressed with reference to FIG. 8B as $\tau 2 = 16T2/\pi D^3$ (in the section $L1$)

$\tau 3 = 16T2/\pi D^3$ (in the section $L2$)

Therefore, $\tau 1 = 2 \cdot \tau 2 = 2 \cdot \tau 3$

This indicates that when the two drive motors 9L and 9R are used, the torsional stress can be reduced down to half. As a result, when the worktable of the same load is moved, since the ball screw 5 can be driven from both the sides in the present invention, the diameter of the ball screw 5 can be reduced and thereby the inertia of the ball screw 5 can be also reduced, so that it is possible to further increase the maximum acceleration. This is further advantageous at the high speed motion of the worktable.

In addition, since the torsional stress can be reduced, the torsional strain of the ball screw can be also reduced, so that the location precision of the worktable can be further improved to that extent.

Figure 9:
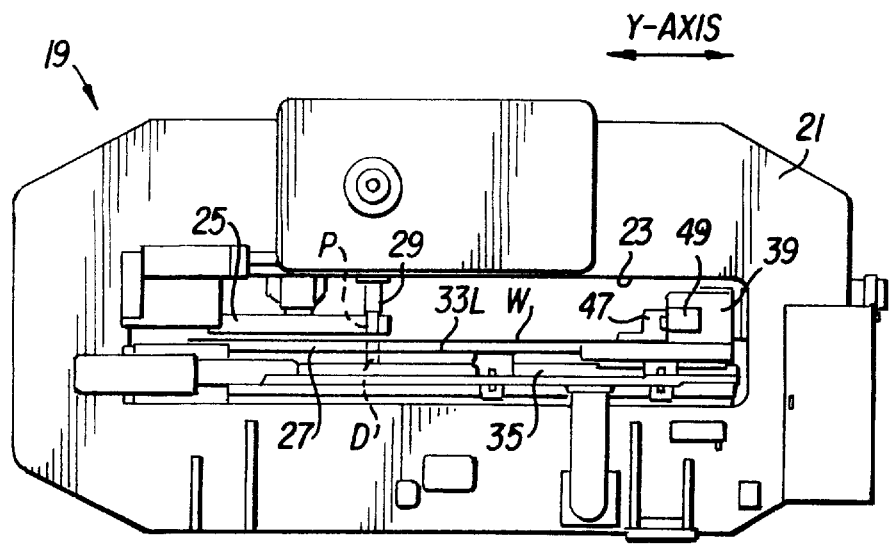
FIG. 9 is a side view showing a turret punch press as an example of the plate processing machine.
Figure 10:
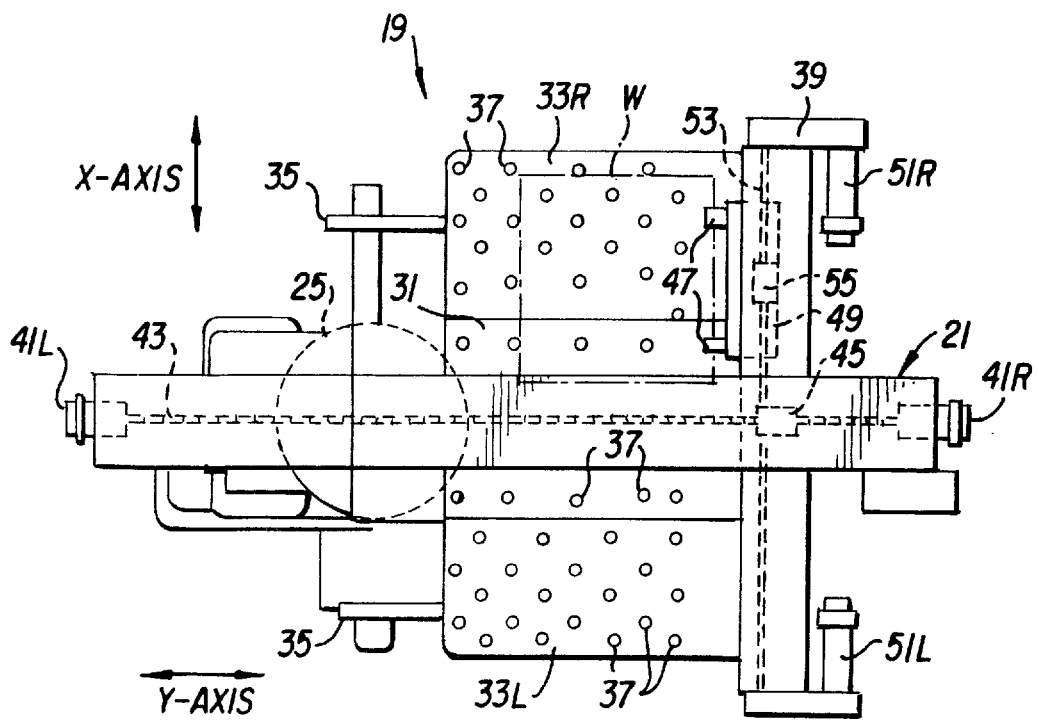
FIG. 10 is a plan view showing the same turret punch press shown in FIG. 9.

With reference to FIGS. 9 and 10, the workpiece feeding apparatus mounted on a pilate processing machine (e.g., a turret punch press) will be described hereinbelow.

The turret punch press (as an example of the plate processing machine) is provided with a vertical frame 21 formed with a gap portion 23 at the middle thereof. In this gap portion 23, an upper turret 25 having a plurality of upper tools (punches) P and a lower turret 27 having a plurality of lower tools (dies) D are mounted and arranged so as to be indexed. Further, a striker 29 is provided over the upper turret 25 to strike the selected one of the upper punches P.

Therefore, after any desired tool pair of the punch P and the die D is selected and further work W is located between the selected punch P and die D, when the punch P is struck by the striker 29, the work W can be punched in cooperation of the die D.

In the above-mentioned gap portion 23, a fixed table 31 is arranged, and two movable tables 33L and 33R are provided on both sides (the upper and lower side in FIG. 10) of the fixed table 31. Under these movable tables 33L and 33R, a pair of guide rails 35 are provided extending in the Y-axis direction (the right and left direction in FIGS. 9 and 10). Further, two sliders (not shown) are provided on the lower surfaces of the two movable tables 33L and 33R along a pair of the guide rails 35. Further, on the upper surfaces of the fixed table 31 and the movable tables 33L and 33R, a number of free bearings 37 are arranged to support the workpiece W adjustably.

On the upper surface of the movable tables 33L and 33R in FIG. 9 and on the right side end in FIG. 10, a carriage base 39 linked with the right and left movable tables 33L and 33R is mounted so as to cross the fixed table 31. Therefore, carriage base 39 can be moved in the Y-axis direction together with the right and left movable tables 33L and 33R.

To move the movable tables 33L and 33R and the carriage base 39, two Y-axis motors 41L and 41R are mounted on the right and left ends of the frame 21. A Y-axis ball screw 43 is rotatably supported between the right and left Y-axis drive motors 41L and 41R via a gear mechanism (not shown).

On the other hand, on the middle lower surface of the carriage base 39, a Y-axis ball nut 45 is mounted in mesh with the Y-axis ball screw 43. Therefore, when the Y-axis ball screw 43 is rotated, the carriage base 39 can be moved in the Y-axis direction and located in position.

On the carriage base 39, a carriage 49 having a clamper 47 for clamping the workpiece W is mounted so as to be movable in the X-axis direction (in the vertical direction in FIG. 10). Two carriage motors 51L and 51R are mounted on both ends of the carriage base 39. Further, an X-axis ball screw 53 is mounted between the two carriage motors 51L and 51R via a gear mechanism (not shown). Further, an X-axis ball nut 55 is mounted on the carriage 49 in mesh with the X-axis ball screw 53.

Here, the motion mechanism in the X-axis direction composed of the carriage motors 51L and 51R mounted on the carriage base 39, the X-axis ball screw 53 and the X-axis ball nut 55 is constructed in the same way as with the case of the motion mechanism in the Y-axis direction. That is, the workpiece W can be fed in the X-axis direction when the X-axis ball screw 5 3 is rotated by the two drive motors 51L and 51R mounted on both sides thereof.

In the turret punch press as described above, when the Y-axis drive motors 41L and 41R are driven to rotate the Y-axis ball screw 43, the carriage base 39 can be moved and located in the y-axis direction. Further, when the carriage drive motors 51L and 51R are driven to rotate the X-axis ball screws 53, the carriage 49 on which workpiece W is supported by the workpiece clamper 47 is moved and located in the X-axis direction. After the work W has been located in position between the upper punch P and the lower die D, when the striker 29 is struck against the workpiece W, the workpiece W can be punched out.

In the turret punch press 19 using the workpiece feeding apparatus according to the present invention, since the workpiece W can be located in both the X- and Y-axis directions at high speed in a short time, it is possible to improve the work efficiency. In addition, since the torsional stress generated in each of the ball screws 43 and 53 can be reduced, it is possible to further increase the locating precision of workpiece W.

Further, although the workpiece feeding apparatus according to the present invention has been explained by taking only the case when applied to the turret punch press 19, without being limited thereto, the workpiece feeding apparatus can be widely applied to any machines as the workpiece feeding and locating apparatus.

Further, in the above-mentioned embodiment, the workpiece feeding apparatus has been applied to both the X- and Y-axis directions, it is of course possible to apply the workpiece feeding apparatus to any one of the directions.

As described above, in the workpiece feeding apparatus for a plate processing machine according to the present invention, since the ball screw is rotated by driving the two drive motors provided on both sides thereof, a large driving force can be obtained. As a result, even if the lead of the ball screw is increased, since the maximum speed and the high acceleration can be both obtained, it is possible to locate work at any desired position at a short time. Further, since the ball screw is rotated at both the ends thereof, it is possible to reduce the torsional stress an torsional strain both generated in the ball screw, so that the locating precision can be further improved.

What is claimed is:

1. A workpiece feeding apparatus for a plate processing machine, said workpiece feeding apparatus comprising:

a carriage for mounting a workpiece;

a ball nut attached to said carriage;

a ball screw rotatably supported on both sides of said plate processing machine and in mesh with said ball nut, said ball screw being in a form of a shaft; and two drive motors symmetrically arranged on both sides of said ball screw respectively, said two drive motors rotating said ball screw simultaneously to feed said carriage via said ball nut in an axial direction of said ball screw.

2. A workpiece feeding apparatus for a plate processing machine, said workpiece feeding apparatus comprising:

a carriage having a clamper for clamping a workpiece;

a first ball nut attached to said carriage;

a first ball screw rotatably supported on both sides of said plate processing machine and in mesh with said first ball nut, said first ball screw being in a form of a shaft; and two first drive motors symmetrically arranged on both sides of said first ball screw respectively, said two first drive motors rotating said first ball screw simultaneously to feed said carriage via said first ball nut in a first axis direction;

a carriage base for movably supporting said carriage in the first axis direction;

a second ball nut attached to said carriage base;

a second ball screw rotatably supported on both sides of said plate processing machine and in mesh with said second ball nut, said second ball screw being in a form of a shaft; and two second drive motors symmetrically arranged on both sides of said second ball screw respectively, said two second drive motors rotating said second ball screw simultaneously to feed said carriage base via said second ball nut in a second axis direction perpendicular to the first axis direction.

3. A plate processing machine provided with the workpiece feeding apparatus as defined in claim 1.

4. A plate processing machine provided with the workpiece feeding apparatus as defined in claim 2.

5. The plate processing machine as defined in claim 3, wherein the plate processing machine is a turret punch press.

6. The plate processing machine as defined in claim 4, wherein the plate processing machine is a turret punch press.

7. A workpiece feeding apparatus for a machine, said workpiece feeding apparatus comprising:

a carriage;

a first ball nut attached to said carriage;

a first ball screw rotatably supported on both sides of said machine and in mesh with said first ball nut, said first ball screw being in a form of a shaft;

two first drive motors symmetrically arranged on both sides of said first ball screw respectively, said two first drive motors rotating said first ball screw simultaneously to feed said carriage via said first ball nut in a first axis direction;

a carriage base for movably supporting said carriage in the first axis direction;

a second ball nut attached to said carriage base;

a second ball screw rotatably supported on both sides of said plate processing machine and in mesh with said second ball nut, said second ball screw being in a form of a shaft; and two second drive motors symmetrically arranged on both sides of said second ball screw respectively, said two second drive motors rotating said second ball screw simultaneously to feed said carriage via said second ball nut in a second axis direction perpendicular to the first axis direction.

* * * * *